April 2, 1957
L. ROSEMAN
2,787,228
MACHINE FOR STITCHING FASTENER TAPE
FOR FORMING FASTENER SECTIONS
Filed Dec. 9, 1953
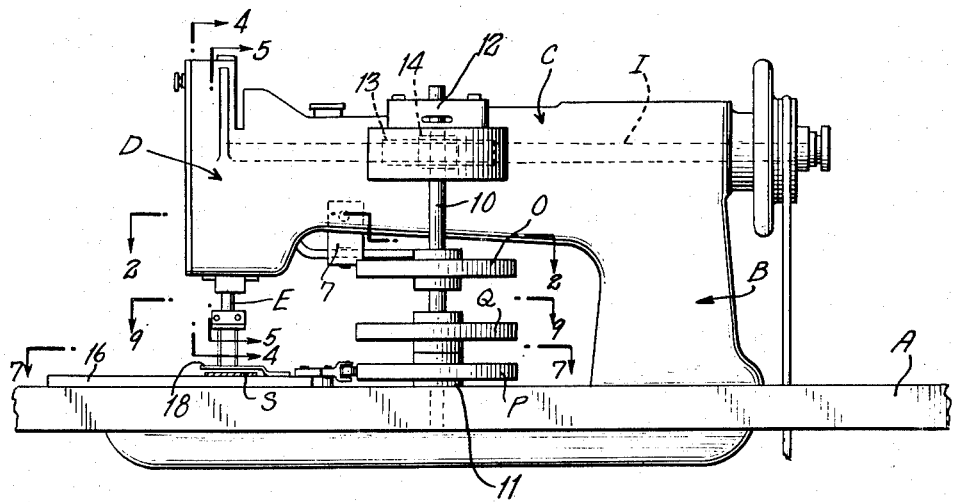
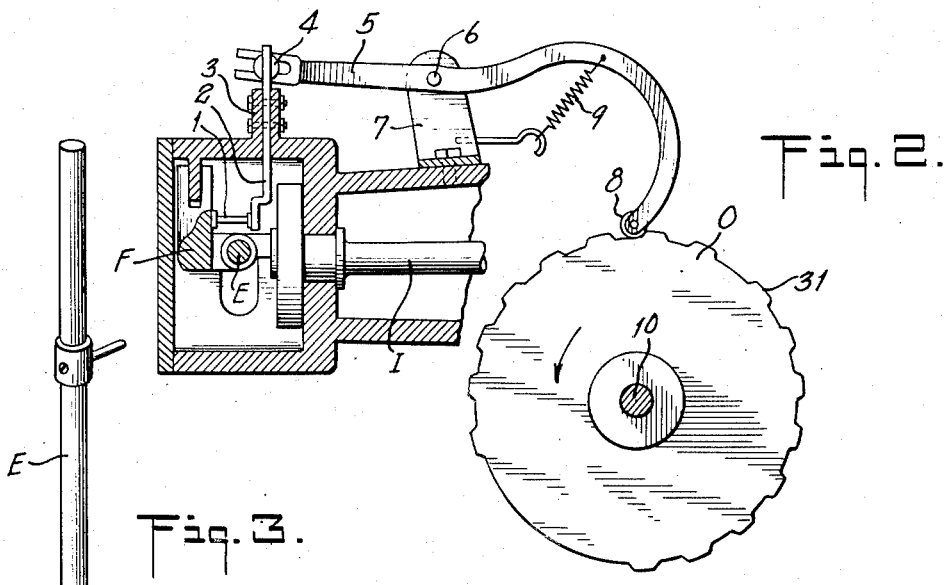
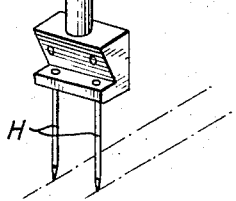
INVENTOR.
LEO ROSEMAN
BY
ATTORNEY

INVENTOR.
LEO ROSEMAN

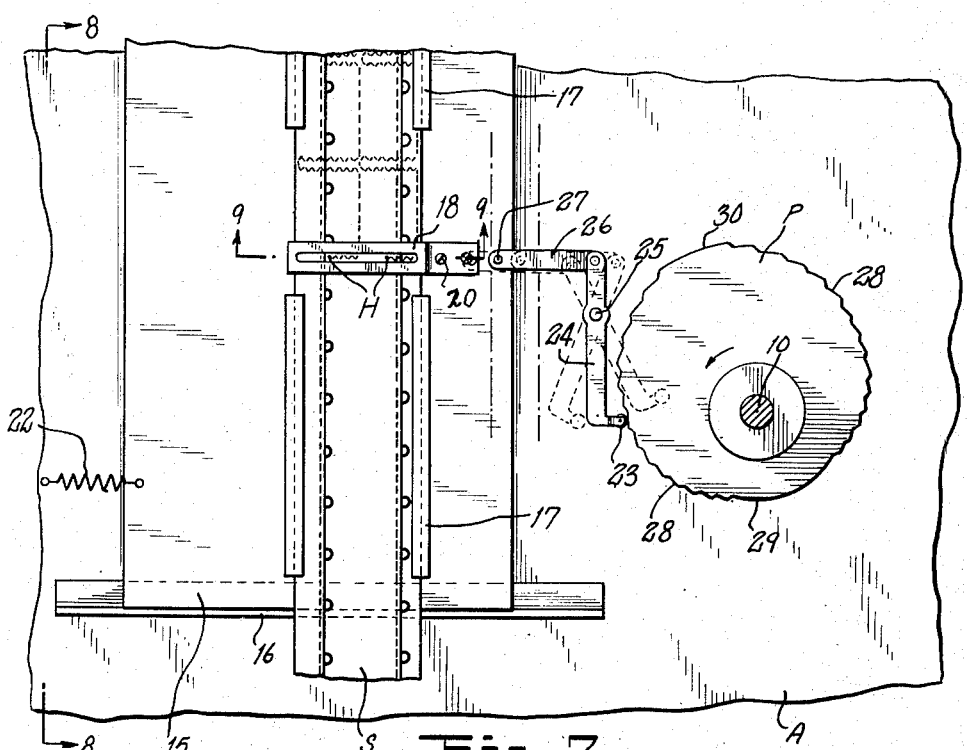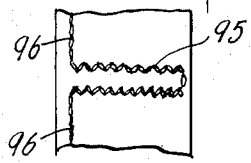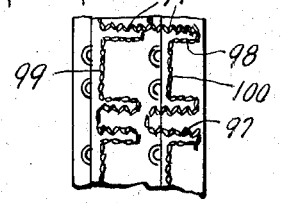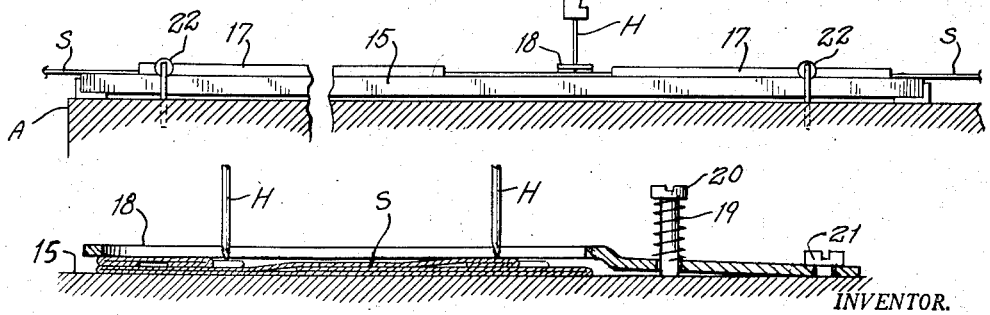

INVENTOR.
LEO ROSEMAN
BY
*Harry Cook*
ATTORNEY

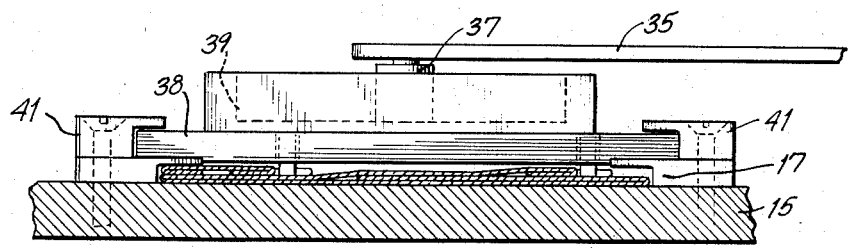
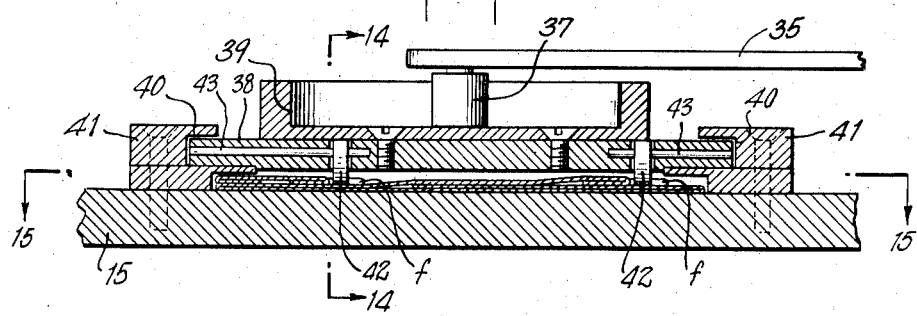
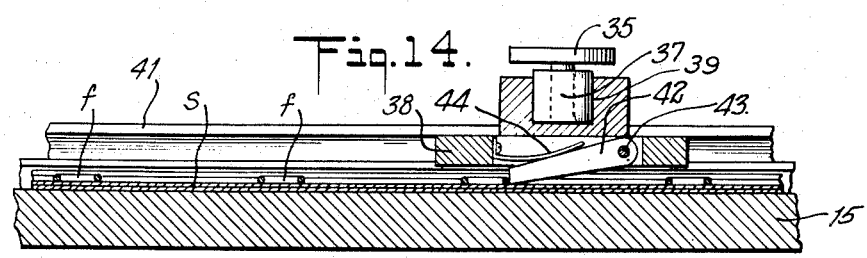
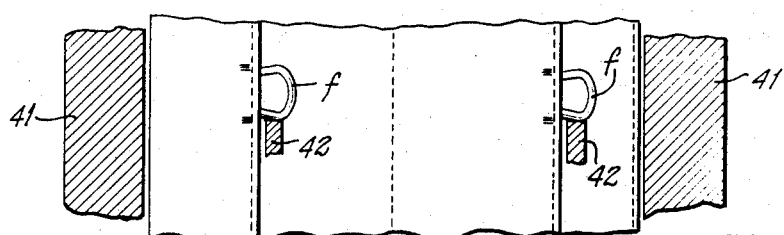
INVENTOR.
LEO ROSEMAN

INVENTOR.
LEO ROSEMAN
BY
ATTORNEY

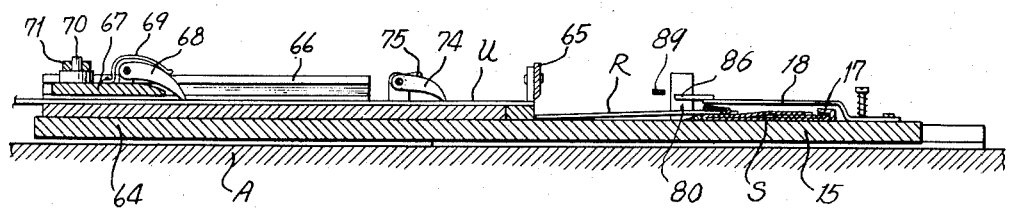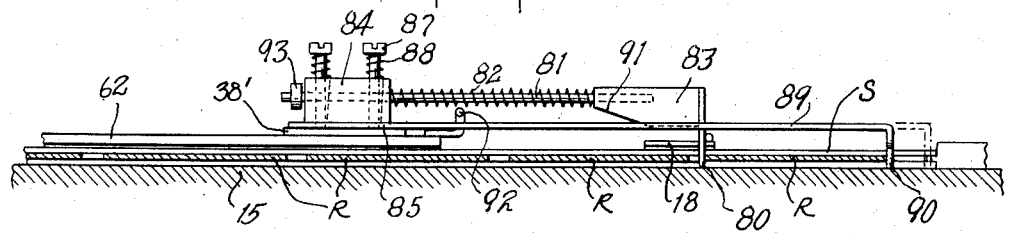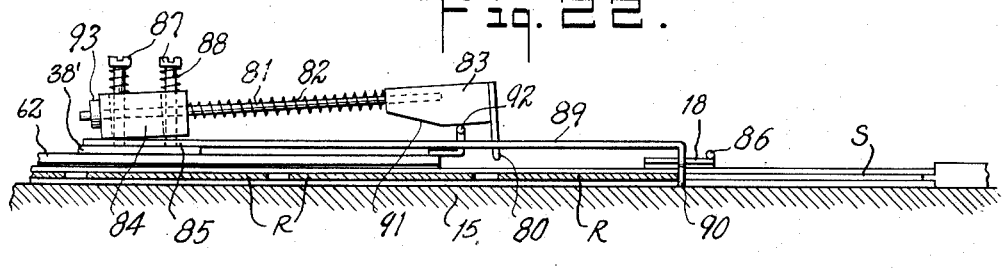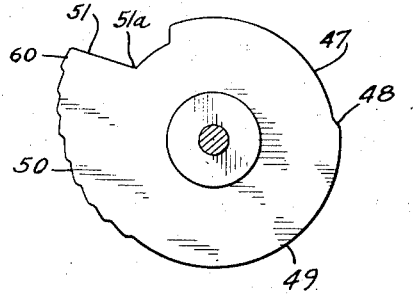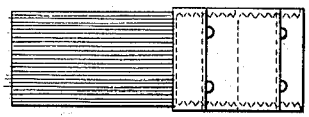

United States Patent Office 2,787,228
Patented Apr. 2, 1957

2,787,228

MACHINE FOR STITCHING FASTENER TAPE FOR FORMING FASTENER SECTIONS

Leo Roseman, Newark, N. J.

Application December 9, 1953, Serial No. 397,118

14 Claims. (Cl. 112—2)

The machine of the invention is intended especially for the production of fastener tape sections like those described and claimed in my copending application Ser. No. 389,984 filed November 3, 1953, according to the method described in part in my copending application Ser. No. 353,200 filed May 5, 1953 now Patent No. 2,746,412, dated May 22, 1956.

In the manufacture of brassieres and bandeaux, a serious problem is encountered in the assembling of an elastic strip or tape or other portion of a garment with a section of eye fastener tape that includes a piece of fabric having one or more wire eyes secured thereon to cooperate with hooks on another portion of the garment. Heretofore the eye fastener section has been prefabricated with a predetermined width to correspond to the width of the elastic tape to be attached thereto and with a minimum of tolerance. Inasmuch as elastic tape at the present time can not be made with a tolerance less than about one-sixteenth of an inch, elastic tape of any stated width, for example one and one-half inches, may be one and one-half inches plus or minus one-sixteenth of an inch. Consequently, the assembly of the elastic tape and the fastener section is asymmetrical, unsightly and undesirable. Moreover, it is not possible to trim off the edges of either the fastener section or the elastic tape because raveling would immediately result. Inasmuch as only perfect assemblies are permissible in expensive garments, the waste of assemblies has been tremendous.

As one solution of the problem, I proposed in my aforesaid copending application Ser. No. 389,984 to provide a fastener section comprising two superposed pieces of material having fastener elements thereon, said pieces being secured together and forming a rectangular pocket between them, the mouth of which extends along one edge of said pieces and in which is secured a portion of a garment, for example the end of an elastic tape; and a prime object of the present invention is to provide a novel and improved machine for making such fastener sections rapidly, at low cost and accurately so that an elastic tape can be easily and quickly attached to the fastener section in a symmetrical and attractive manner.

Another object is to provide a machine of this character which shall automatically form a continuous strip of material having a plurality of layers or plies of material and a plurality of pairs of closely spaced parallel transverse lines of stitches extending across said strip and a longitudinal line of stitches extending lengthwise of said strip between each two next adjacent pairs of transverse lines of stitches and parallel to and spaced from one of the longitudinal edges of said strip to thereby provide pockets between said plies whose mouths open along said edge thereof, each bounded by two of said transverse lines of stitches and one of said longitudinal lines of stitches so that said continuous strip can be severed between each pair of transverse lines of stitches to form individual fastener sections.

Another object is to provide such a machine for forming a plurality of series or pairs of parallel lines of transverse stitches in one continuous operation, in contrast to the forming of two parallel lines of stitches, stopping the sewing needle, then feeding the tape longitudinally for the next pair of lines of stitches and thereafter starting the needle to form the next pair of transverse lines of stitches, and so on as has been common in the art heretofore.

A still further object of the invention is to provide a machine for forming fastener sections, which shall include a novel and improved means for moving a multiple ply strip of fabric or the like longitudinally step by step beneath at least one machine needle to form longitudinal lines of stitches, then moving said strip laterally beneath a needle to form one transverse line of stitches, then moving the strip longitudinally a short distance to form at least one longitudinal stitch, then moving the strip transversely in the opposite direction to form another transverse line of stitches, then again moving the strip longitudinally step by step for a predetermined distance, and then moving the strip transversely to form the next transverse line of stitches and so on, thereby to produce a continuous strip of material having a plurality of fastener sections spaced longitudinally thereof that can be severed from the strip by cutting the strip transversely between the line of stitches of each transverse pair of lines of stitches.

A further object is to provide, in combination with such a machine, novel and improved means for inserting elastic tape sections or the like between said plies along one longitudinal edge thereof and securing one of said tape sections in a pocket of each fastener section.

Other objects, advantages and results of the invention will be brought out by the following description in conjunction with the accompanying drawings in which Figure 1 is a front elevational view of a sewing machine including apparatus constructed in accordance with the invention for forming fastener tape sections;

Figure 2 is a fragmentary horizontal sectional view approximately on the plane of the line 2—2 of Figure 1;

Figure 3 is a detached perspective view of the needle bar and two needles mounted therein;

Figure 7 is a fragmentary horizontal sectional view approximately on the plane of the line 7—7 of Figure 1, showing the mechanism for moving the continuous strip of fabric laterally;

Figure 8 is a transverse vertical sectional view approximately on the plane of the line 8—8 of Figure 7 showing the support plate for the continuous strip of fabric in end elevation;

Figure 9 is an enlarged fragmentary vertical sectional view on the plane of the line 9—9 of Figure 7;

Figure 12 is an enlarged vertical sectional view on the plane of the line 12—12 of Figure 10;

Figure 13 is a similar view on the plane of the line 13—13 of Figure 10;

Figure 14 is a transverse vertical sectional view approximately on the plane of the line 14—14 of Figure 13;

Figure 15 is a fragmentary horizontal sectional view on the plane of the line 15—15 of Figure 13;

Figure 20 is a vertical sectional view approximately on the plane of the line 20—20 of Figure 16;

Figure 21 is a fragmentary vertical sectional view approximately on the plane of the line 21—21 of Figure 16;

Figure 22 is a similar view showing the pusher arm and the stop finger in the positions assumed during the longitudinal feeding of the strip of fastener sections;

Figure 23 is a plan view of a cam for controlling the longitudinal feed of the strip and the actuation of the pusher arm that are illustrated in Figures 16, 17 and 20-22 inclusive;

Figure 24 is a plan view of an individual fastener section and a section of elastic tape secured thereto and illustrating a modified form of stitching for attaching the elastic tape section to the fastener section;

Figure 25 is a fragmentary plan view of a fastener section showing lines of stitches formed by a single needle; and Figure 26 is a fragmentary plan view of a strip of fastener sections showing a modified form of stitching.

Figure 18:
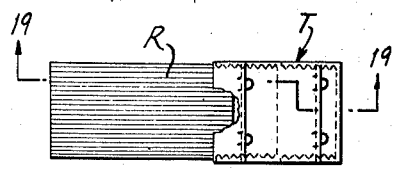
Figure 18 is a plan view of one of the individual fastener sections separated from the continuous strip and having an elastic tape section attached thereto.
Figure 19:
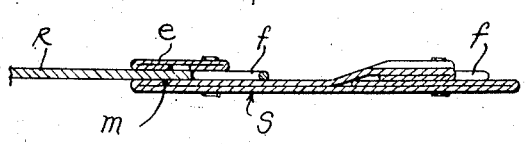
Figure 19 is an enlarged vertical sectional view on the plane of the line 19—19 of Figure 18.

The machine of the invention is especially designed to make a continuous strip S of fastener sections (see Figure 6) which comprises a base portion $a$ formed of a single piece of fabric having longitudinal portions $b$ and $c$ folded inwardly into superposed relation to each other and to the main portion of said piece, the portion $c$ having its edge folded inwardly and overlying fastener elements, particularly wire eyes $d$, that are spaced apart longitudinally of the strip. A secondary piece $e$ of fabric is arranged in superposed relation to the opposite edge portion of the main piece $a$ with its inner edge overlying fastener elements $f$ of another row of fastener elements and with its other edge substantially coincident with the corresponding edge of the main piece $a$. The rows of fastener elements $d$ and $f$ are shown as fastened on the strip S by longitudinal lines of stitches $h$ penetrating at least one ply of the strip and including offset or tying stitches $i$ traversing the base loops of the fastener elements. Extending transversely of the strip S are a plurality of pairs of lines of stitches $g$, preferably zig-zag stitches, and the strip S eventually is severed between the two lines of stitches of each pair of lines of stitches to form separate fastener sections T (see Figures 18 and 19). Preferably, the several pairs of transverse lines of stitches $g$ are portions of a continuous series of stitches that also includes lines of stitches $k$ running longitudinally of the strip between the pairs of transverse lines.

Figure 4:
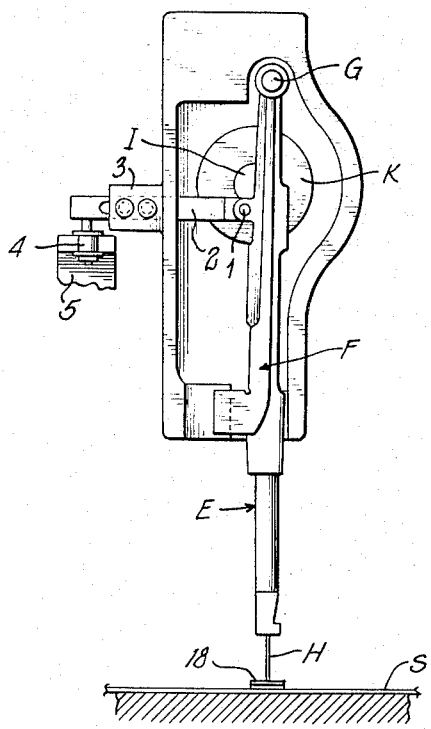
Figure 4 is an end elevational view of the stitching head with the cover plate removed, approximately on the plane of the line 4—4 of Figure 1.
Figure 5:
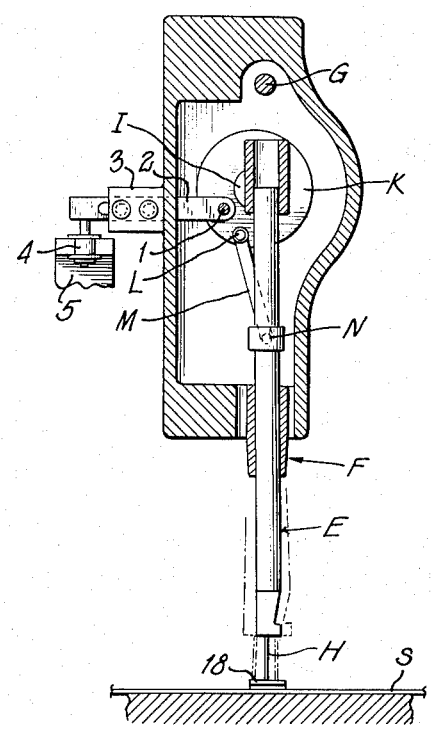
Figure 5 is a vertical sectional view through the stitching head approximately on the plane of the line 5—5 of Figure 1, with the needle bar supporting bracket removed.

For the purpose of illustrating the principles of the invention, I have shown it in connection with a sewing machine of the type illustrated and described in my Patent No. 2,153,006, dated April 4, 1939. The machine includes a bed plate A having the usual standard B thereon, formed with a gooseneck C at one end of which is mounted the stitching head D. In the stitching head is a needle bar E which is mounted to move back and forth in a plane parallel to the direction of the work. As shown in Figures 4 and 5, the needle bar is reciprocatory in a bracket F which is pivotally mounted at G to swing about a horizontal axis, and the needle bar carries one or more needles as desired, in the present instance two needles H, which are caused to penetrate and withdraw from the work upon reciprocation of the needle bar in known manner. The needle bar may be driven from the drive shaft I of the machine which is journaled in the standard B and gooseneck C, and as shown, the shaft I carries a disk K on which is a wrist pin L which is connected by a link M to a pin N on the needle bar.

With the needle bar and its needles cooperates a bobbin mechanism of the usual type (not shown), the needle bar, its operating devices and the bobbin with its cooperating parts constituting a stitch forming mechanism.

Instead of the usual work feeding mechanism including the known work feed dog, special means for feeding the work is provided by the invention. While ordinary straight stitches may be utilized in making the fastener tape sections, it is preferred that the transverse lines of stitches are of the zig-zag type, and for that reason the needle bar has been shown as oscillatory as above indicated. For oscillating or moving the needle bar back and forth in timed relation to the movement of the work feed mechanism and reciprocation of the needle bar, the bracket F has been shown as provided with a lateral pin 1 which is connected to a link 2 slidably mounted by a bolt and slot connection 3 in the stitching head D. The end of the link projects beyond the rear side of the stitching head and has a pin and slot connection 4 with one end of a lever 5 which is pivotally mounted intermediate its ends at 6 on a standard 7 secured to the rear side of the gooseneck of the machine. The other end of the lever 5 carries a follower roller 8 which follows a cam O and and is held in engagement with the cam by the tension spring 9. The form of the cam O will be varied to correspond to the length and timing of the oscillating movements desired in the needle bar, as hereinafter described, so as to move the needle bar back and forth in a plane parallel to the direction of the movement of work by the work feed mechanism.

As shown, the cam O is mounted on an auxiliary shaft 10 that is journaled with its axis vertical in bearings 11 and 12, and has a worm gear 13 which meshes with a worm 14 on the drive shaft I. Preferably the ratio of the gearing 13, 14 is such that the cam will be rotated one revolution for a number of the revolutions of the drive shaft corresponding to the number of stitches to be formed on each revolution of the cam.

For forming the transverse stitches $g$, the work is moved laterally of itself in its own plane, while to form the longitudinal stitches $k$ the work is moved longitudinally although, of course, as will be understood by those skilled in the art, instead of moving the work, the needles might be moved. In Figures 1 and 7 is schematically shown mechanism for moving the work or strip of fabric laterally, said mechanism including a work supporting plate or holder 15 that is mounted in guides 16 on the bed A of the machine to move back and forth beneath the needles H. On the work supporting plate are parallel guides 17 for guiding the movement of the work or strip S longitudinally beneath the needles, said guides 17 also constraining the strip S to move laterally with the work supporting plate 15. The work of the strip S, preferably with the fastener elements already stitched thereon, is fed beneath the guides 17 as shown in Figures 7 and 12-14 inclusive and under a presser finger 18 that has a slot through which the needles H pass into contact with the strip, the presser being normally yieldingly pressed toward the work by a spring 19 interposed between the presser finger and the head of a screw 20 that passes loosely through a hole in the presser finger and into the work supporting plate 15, the presser finger being held against swinging in its own plane by a screw 21.

The work supporting plate 15 is moved in one direction, namely to the left in Figure 7, by any suitable means, such as tension springs 22, under control of a cam P and is moved in the other direction by said cam. The cam is mounted on the auxiliary shaft 10 and is engaged by a follower roller 23 on one end of a lever 24 that is pivotally mounted intermediate its ends at 25 on the bed plate A and is pivotally connected at its other end to one end of a link 26 the other end of which is pivotally connected at 27 to the work supporting plate 15. The cam P has two series of cam projections 28 and two concentric dwells 29 and 30 between the two series of projections 28, the projections 28 serving to cause movement of the work supporting plate laterally step by step simultaneously with the oscillation of the needles by the cam O which has a plurality of cam projections 31 for oscillating the needles, and the dwells 29 and 30 holding the work against lateral movement.

In operation of the machine so far described, it may be assumed that it is desired to start the formation of the first of a pair of transverse lines of stitches in predetermined spaced relation to one of the fastener elements, and the machine is positioned with one needle disposed close to the right hand longitudinal edge of the strip S with the other needle disposed at about the center of the width of the strip, and the follower roller 23 will be on the dwell 29 and about to be engaged by the first projection 28 (see Figure 7). Upon starting of the machine, the cam P will rotate in the direction of the arrow and the cam projections 28 will move the lever 24 and work supporting plate 15 step by step to the right beneath the needles which are simultaneously oscillated by the cam O so as to form the zig-zag stitches g. This operation is continued until the dwell 30 engages the roller 23 with the needle at a predetermined point in the width of the strip, whereupon the lateral movement of the work will be stopped. During the period of interruption of said lateral movement, the work will be moved longitudinally while the needles are reciprocated so as to form longitudinal stitches l by mechanism to be hereinafter described, after which the roller 23 is engaged by the other series 28 of cam projections so that the work is moved laterally in the opposite direction step by step until the roller 23 is engaged by the dwell 29, thereby stopping the lateral movement of the work with the needle adjacent the point of starting of the first transverse line of stitches and thus completing the second line of the pair of the lines of transverse stitches g. While the dwell 29 is in engagement with the roller 23, the work is again moved longitudinally step by step to form the longitudinal lines of stitches k by mechanism that includes another cam Q on the auxiliary shaft 10.

This cam cooperates with a follower roller 32 that is mounted on one end of a push rod 33 the other end of which has a pin and slot connection 34 with a lever 35 one end of which is pivotally connected at 36 on the bed plate A, while the other end carries a roller 37 which rolls in a slot 39 in a block 38 that is slidable in guide grooves 40 formed by rails 41 fastened to the top of one set of guides 17 (see Figures 10 and 12–14 inclusive).

On the under side of a block 39 are a pair of feed pawls 42 that are pivotally connected at one end at 43 to the block with the other ends attached to engage the fastener elements f on the strip S (Figures 13–15), the pawls being normally pressed into engagement with the strip by springs 44.

The lever 35 is normally influenced in one direction by a spring 45 to move the pawls 42 to the starting point of their feeding movement and to hold the roller 32 in contact with the cam, an adjustable stop screw 46 preferably being provided to be abutted by the lever 35 for limiting the return of the pawls to said starting point.

The cam Q has a concentric dwell 47 to hold the feed pawls stationary during formation of the transverse lines of stitches, and the cam also has a projection 48 for moving the pawls and thereby for moving the strip one step longitudinally to form the single longitudinal stitches l. Another dwell 49 is provided to hold the strip against longitudinal movement during the formation of the second line of each pair of transverse lines of stitches, and a series of cam projections 50 on the cam Q, upon engaging the roller 32, causes the block 38 and feed dogs 42 to be moved step by step while the needles are reciprocated only, thereby to form the longitudinal lines of stitches k between each pair of transverse lines of stitches. It will be understood by those skilled in the art that each step of longitudinal movement of the strip S is equal to the length of one stitch and that the number of cam projections 50 will correspond to the number of stitches to be formed. A cam drop 51 permits the block 38 and pawls 42 to be returned to their starting point at the beginning of the formation of the first line of stitches of each pair of transverse lines of stitches, it being understood that the pawls 42 will slip upwardly and over the fastener elements during this return movement and each pawl will then engage one of the fastener elements f in readiness for the next longitudinal feeding of the strip.

Figure 11:
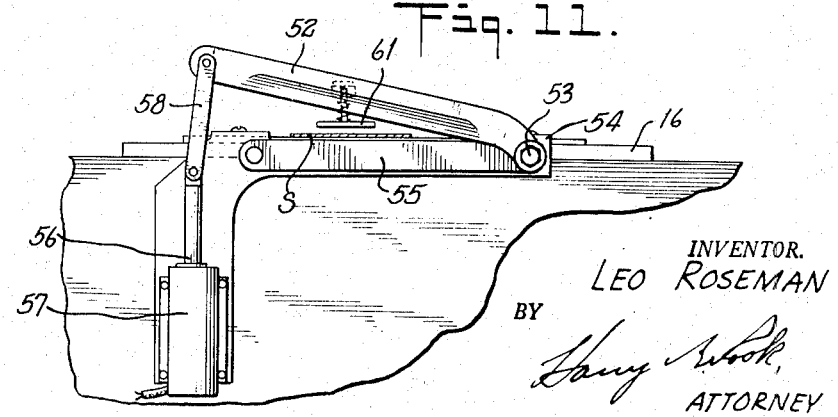
Figure 11 is a fragmentary rear elevational view of the machine approximately from the plane of the line 11—11 of Figure 10.
Figure 16:
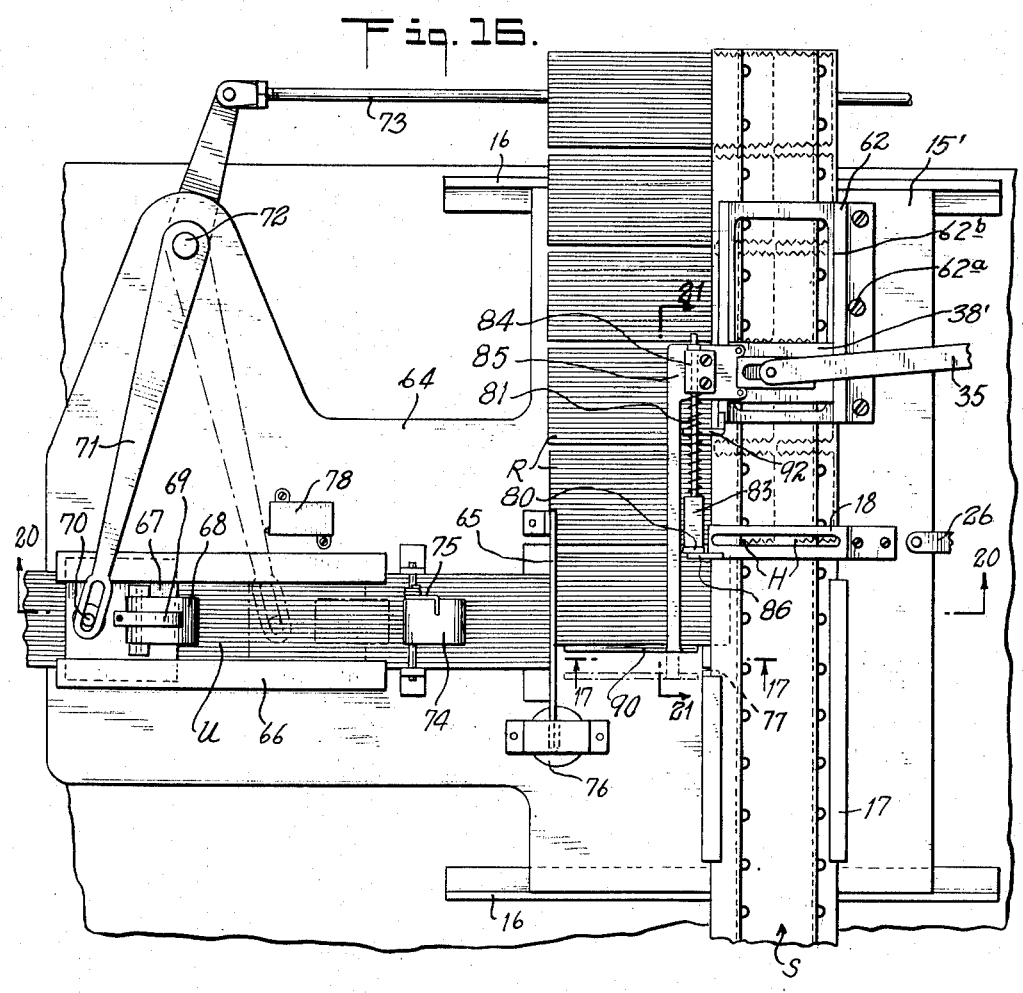
Figure 16 is a top plan view of a modification of the machine similar to Figure 10 and including mechanism for attaching elastic tape sections to the continuous strip of fastener sections.
Figure 17:
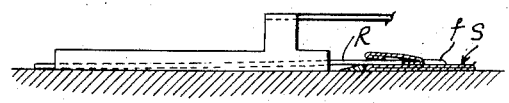
Figure 17 is a fragmentary vertical sectional view on the plane of the line 17—17 of Figure 16.

Conveniently, means is provided for severing the strip S between each pair of transverse lines of stitches g so as to divide the strip into individual fastener sections T, and for the purpose, I have shown a knife blade 52 pivotally mounted at one end as at 53 on a bracket 54 that is carried by the work supporting plate 15, said blade 52 cooperating with a fixed blade 55 to shear the strip S which passes between the blades as best shown in Figure 11. The blades are so related to the feed of the strip S that during the return of the feed pawls to their starting point, the strip is stationarily positioned with the space between a pair of transverse lines of stitches g disposed between the blades 52 and 55, and then the movable blade 52 is actuated, that is, pulled downwardly in Figure 11, so as to shear the strip S thereby separating from the strip the fastener section T at the leading end of the strip. For actuating the shear blade 52, the armature 56 of an electromagnet 57 may be connected by a link 58 to the swinging end of the blade, and the winding of the electromagnet may be energized by the closing of a microswitch 59 that is connected in circuit with said winding and a source of electricity. The microswitch may have an operating lever 63 that is engaged by a cam projection 60 on the cam Q to close the switch at the end of the strip feeding movement of the block 38 and pawls 42. Desirably, a spring-biased presser plate 61 is mounted on the blade 52 to engage and hold the strip S against movement during the shearing operation.

With this construction it will be observed that each fastener section T has a pocket m between one longitudinal edge of the main portion of the strip S and the juxtaposed edge of the secondary piece e, each pocket being bound by two of the transverse lines of stitches g and one portion of one longitudinal line of stitches k and opening at said longitudinal edge of the strip so that a portion of a garment, such as the end of an elastic tape R, may be inserted into and secured in said pocket.

The invention also contemplates mechanism for attaching such elastic tape sections to the strip S of fastener sections. As shown in Figures 16, 17 and 20–22 inclusive, the work supporting plate 15' is moved laterally by the same mechanism heretofore described, and the stitch forming mechanism is operated in the same way as described in connection with Figures 1–15 inclusive. However, the guide 62 for the feed block 38' for longitudinally moving the strip S is slightly modified and is shown as comprising a plate secured to the work supporting plate 15' in spaced and parallel relation to one longitudinal edge of the strip S, as by screws 62a, said guide being free from the strip and spaced inwardly of the other longitudinal edge thereof so as to permit the insertion of the elastic tape sections R between the juxtaposed edges of the main portion of the strip S and the secondary piece e. The guide 62 is rabbeted at 62b to provide guide channels for the feed block 38'. The work supporting plate 15' has an extension 64 on which is mounted means for feeding a strip of elastic tape U from a suitable source, such as a roll (not shown), in steps equal to the length of the tape sections R, to a shearing blade 65 that is mounted on the extension 64 in spaced and parallel relation to said juxtaposed edges of the main portion of the strip S and the secondary piece e.

As shown, the length of elastic tape U is fed through guides 66 on the extension 64 of the work supporting plate 15', and in said guides 66 is slidable a feed block 67 that carries a feed dog 68 which is biased into frictional engagement with the tape by a spring 69, the block having a pin and slot connection with one end of a lever 71 that is pivoted intermediate its ends at 72 on the extension 64 and has its other end connected by a link 73 to a suitable operating mechanism such as a cam for moving the tape U in steps in timed relation to the movement of the feed block 38'. A retard or backstop pawl 74 is biased by a spring 75 into engagement with the tape U so as to permit the tape to be moved toward the strip S by the feed dog 68 and prevent backward movement of the tape upon return movement of the feed dog. At the end of each step of the feeding movement of the tape U, the shear blade 65 is actuated by an electromagnet 76 the winding of which is connected in circuit with a normally open microswitch 78 which is closed by the lever 71 when the latter reaches the end of its feeding movement as shown by broken lines in Figure 16, whereby a tape section R is severed from the length of tape U.

Before severance of the tape section R from the length of tape U, the leading end of the tape is inserted during the feeding operation between the juxtaposed edges of the main portion of the strip S and the secondary piece e, said secondary piece being held in spaced relation to the main portion by a guide finger 77.

In accordance with the invention, the severed tape section R is then slid laterally of itself and lengthwise of the strip S against a stop for positioning the edge of the tape section in proper relation to the transverse line of stitches to be formed, and preferably the position of the tape section is such that said transverse line of stitches will penetrate the edge portion of the tape section to assist in attaching the tape section to the strip S.

As shown, a stop finger 80 on the end of a rod 81 normally is located in the position to stop the movement of the tape section longitudinally of the strip S, the finger being normally held in this position by a spring 82 that is interposed between the collar 83 on the rod 81 and a bearing block 84 mounted on a bracket 85 rigidly connected to the feed block 38', in which bearing block the rod 81 is slidable, said spring holding the collar 83 against a fixed stop arm 86 on the presser finger 18 as best shown in Figures 16 and 20–22. The block 84 is yieldably mounted on the bracket 85 by means of bolts 87 that pass loosely through holes in the bearing block and are secured in the bracket 85 with springs 88 between their heads and the top of the block so that said block may tilt in a vertical plane and permit the stop finger 80 to be raised out of the path of movement of the tape sections R.

Also extending from the bracket 85 is a pusher arm 89 that has a depending pusher finger 90 at one end to engage the edge of the last severed tape section R and to push said section against the stop finger 80. During the return movement of the feed block 38', the finger 90 moves with the block, and the block is actuated beyond the starting point of its feeding operation a distance equal to the normal distance that the last severed tape section R must be moved after its severance into engagement with the stop finger 80, as shown by broken lines in Figure 21, so that the feed dogs 42 are spaced a distance behind the fastener elements d and f sufficient to permit the finger 90 to move the tape section into engagement with the stop finger when movement of the feed block is started in the direction to longitudinally feed the strip S. This is effected by a modification of the periphery of the cam Q as shown in Figure 23 where the cam drop 51 is deepened or lengthened as indicated at 51a, the stop screw 46 being correspondingly adjusted to permit the necessary movement of the lever 35. When the tape section engages the stop finger 80, the feed dogs engage the fastener elements and longitudinal feeding of the strip A is begun and the stop finger 80 moves with the feed block and pusher finger 90 by virtue of engagement of the bearing block 84 with a collar 93 on the stop rod. Shortly thereafter the stop rod 81 is elevated to move the stop finger 80 above the tape sections by engagement of a beveled surface 91 on the collar 83 with a rod 92 fixed on the work supporting plate 15, whereupon the spring 82 will return the stop finger to its normal position that is determined by engagement of the collar 83 with the stop arm 86.

It will be understood that the last severed tape section R will be moved into engagement with the stop finger 80 in timed relation to the formation of the transverse line of stitches g and if desired, the tape section can be so positioned that the transverse stitches will penetrate a portion of the edge of the tape section that abuts the stop finger 80. After said transverse line of stitches has been formed, the strip S will be moved longitudinally step by step to form the longitudinal lines of stitches k and the last severed tape section will be moved with the strip for the formation of the next transverse line of stitches along the other edge of said tape section; and by that time said last severed tape section will have been moved away from the shearing blade 52 so that the next tape section can be fed and severed in the manner above described.

It will be observed that if the tape section R should be slightly wider than the distance between the pairs of transverse lines of stitches g, the pusher arm 90 will slightly buckle the tape section so that the two longitudinal edges of the tape section will be properly related to the corresponding transverse lines of stitches, as described in my copending application Ser. No. 389,984.

In some instances it may be desirable to utilize one of the longitudinal lines of stitches k for fastening the tape sections R on to the strip S, as shown in Figure 24; and, of course, this can be done by changing the relation of the transverse feeding of the strip S to the needles so that the line of stitches k will be formed along the juxtaposed edges of the main portion of the strip S and the secondary piece e instead of along the opposite longitudinal edge of the main portion as shown in the other figures of the drawing. In other words, the transverse lines of stitches will be started at the left hand longitudinal edge of the strip, as shown in Figure 24, instead of at the right hand longitudinal edge, as shown in Figure 6.

Figure 6:
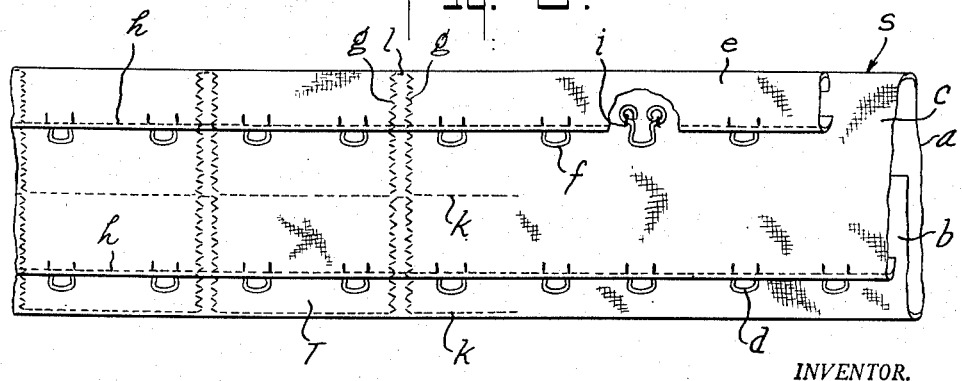
Figure 6 is a fragmentary plan view of a portion of a strip of fastener sections made on the machine of the invention.
Figure 10:
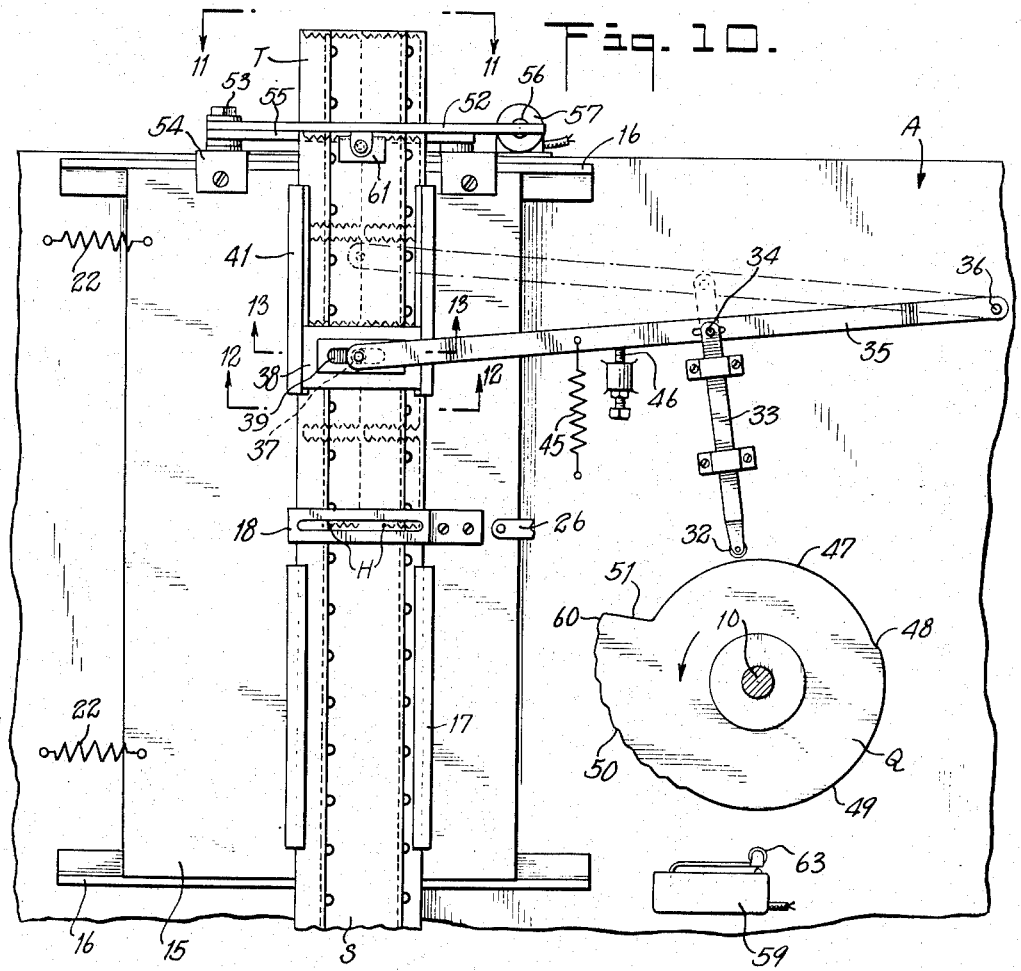
Figure 10 is a view similar to Figure 7 showing the mechanism for moving the continuous strip longitudinally step by step.

It should also be understood that the transverse stitches could be formed by a single needle, instead of by two needles as shown, by simply moving the work or strip a greater distance transversely, and as shown in Figure 25, each transverse line of stitches 95 is continuous across the strip instead of being formed of two portions $g^1$ and $g^2$ in Figure 6, and only one series of longitudinal lines of stitches 96 is formed along a folded edge of the main piece of the strip like the stitches k of Figure 6. It will have been understood by this time that by using two needles the transverse stitches can be formed entirely across the strip in half the time required with one needle, and also two longitudinal lines of stitches can be formed with the two needles.

Other modifications in the formation of the stitches can be made within the spirit and scope of the invention, for example as shown in Figure 26 where the zig-zag stitches 97 are combined with lines of stitches 98 that extend transversely of the strip parallel to the stitches 97 and are continuous with lines 99 and 100 that extend along the edge of the main or base portion a and the inner edge of the secondary piece e, respectively, and traverse the fastener elements d and f. All of these stitches 97–100 inclusive penetrate all of the plies or layers of fabric in the strip and the longitudinal stitches 100 form the bottom of the pocket between the base portion *a* and the secondary piece *e* of the strip.

To form the stitches 97–100 inclusive, it is merely necessary to momentarily interrupt the cams O and P and bring into action another cam for moving the work supporting plate 15 transversely to form the stitches 98 and then resume operations with the cams as above described.

In all forms of the invention, a positive stop preferably is provided close to the needle to be engaged by certain of the fastener elements on the strip for accurately positioning the fastener elements relative to the needle, means being also provided to actuate said stop into and out of the path of movement of the fastener elements in timed relation to the longitudinal feed of the strip.

What I claim is:

1. In a machine for finishing a strip of material having fastener elements arranged in predetermined spaced relation in a row longitudinally of said strip to form fastener sections, each fastener section to include at least one fastener element, the combination of a machine bed, a stitch forming mechanism including at least one needle and means for reciprocating it, means to move said strip longitudinally step by step beneath said needle to form a line of stitches longitudinally of said strip and then to interrupt said movement for a predetermined period with the needle at a point in predetermined spaced relation to one of said fastener elements, means to cause relative movement of said strip and said needle step by step in one direction transverse of said strip during said period of interruption of said longitudinal movement of the strip to form a line of stitches transverse of the strip and in continuation of said longitudinal line of stitches and then to interrupt said relative movement of the strip and needle transversely of the strip with the needle at a predetermined point in the width of the strip.

2. In a machine as defined in claim 1, the addition of means to move said strip a predetermined distance longitudinally upon said interruption of said transverse movement and then to interrupt the second-mentioned longitudinal movement to form at least one longitudinal stitch, and means to cause relative movement of said needle and said strip transversely of the strip step by step a predetermined distance in the direction opposite to the first-mentioned transverse movement to form a second line of stitches transverse of said strip and in continuation of the last-mentioned longitudinal stitch.

3. In a machine as defined in claim 1, the addition of means for oscillating said needle during said relative movements of the needle and the strip transversely of the strip to form zig-zag stitches.

4. In a machine as defined in claim 2, the addition of means for oscillating said needle during each of said relative movements of the needle and the strip transversely of the strip to form zig-zag stitches.

5. In a machine as defined in claim 1, said means for moving said strip longitudinally comprising a supporting plate and guide for said strip, a feed pawl engageable with said fastener elements upon movement of the pawl in one direction for moving said strip, and means to actuate said feed pawl in timed relation to the reciprocation of said needle.

6. In a machine as defined in claim 1, said means for moving said strip longitudinally comprising a supporting plate and guide for said strip, a feed pawl engageable with said fastener elements upon movement of the pawl in one direction for moving said strip longitudinally, means to actuate said pawl in timed relation to the reciprocation of the needle, and said means for causing relative movement of the strip and needle transverse of the strip including means to actuate said supporting plate and guide in directions transverse of the direction of longitudinal movement of said strip in timed relation to the reciprocation of said needle.

7. In a machine as defined in claim 6, a presser foot movable with said supporting plate and guide and formed to yieldingly frictionally press said strip between the presser foot and said supporting plate during longitudinal movement of the strip and to clamp said strip against movement laterally relatively to said supporting plate during transverse movement of the strip.

8. In a machine as defined in claim 6, the addition of means for a feeding an elongate piece of tape to a position with one end of said piece in superposed relation to one longitudinal edge portion of said strip immediately prior to the formation of the second-mentioned transverse line of stitches, and means for locating said piece of tape in a position so that one longitudinal edge portion of said piece of tape will be penetrated by said second-mentioned transverse line of stitches.

9. In a machine as defined in claim 1, the addition of another needle spaced from the first-mentioned needle transversely of the direction of longitudinal feed of said strip and movable with the first mentioned needle, and the third-mentioned means being disposed to cause said relative movement of the needle and the strip transversely of the strip in the direction of spacing of said needles.

10. In a machine as defined in claim 2, the addition of another needle spaced from the first-mentioned needle transversely of the direction of longitudinal feed of said strip and movable with the first mentioned needle, and the third-mentioned means and the last-mentioned means being disposed to cause said relative movements of the needle and the strip transversely of the strip in the direction of spacing of said needles.

11. In a machine as defined in claim 2, the addition of another needle spaced from the first-mentioned needle transversely of the direction of the longitudinal feed of said strip and movable with the first mentioned needle, and the third-mentioned means and the last-mentioned means being disposed to cause said relative movements of the needle and the strip transversely of the strip in the direction of spacing of said needles, and the further addition of means for oscillating said needles during said relative movements of said needles and said strip transversely of the strip.

12. In a machine as defined in claim 2, the addition of means for feeding an elongate piece of tape to a position with one end of said piece in superposed relation to one longitudinal edge portion of said strip immediately prior to the formation of the second-mentioned transverse line of stitches, and means for locating said piece of tape in a position so that one longitudinal edge portion of said piece of tape will be penetrated by said second-mentioned transverse line of stitches.

13. In a machine as defined in claim 2, the addition of means for feeding an elongate piece of tape to a position with one end of said piece in superposed relation to one longitudinal edge portion of said strip immediately prior to the formation of the second-mentioned transverse line of stitches, and stop means for locating said piece of tape in a position so that one longitudinal edge portion of said piece of tape will be penetrated by said second mentioned transverse line of stitches, and the further addition of a pusher element to engage said piece of tape, and means for actuating said pusher element to move said piece of tape against said stop means.

14. In a machine as defined in claim 1, said means for moving said strip longitudinally comprising a holder and guide for said strip, a feed pawl for moving said strip longitudinally, means to actuate said pawl in timed relation to the reciprocation of the needle, and said means for causing relative movement of the strip and needle transverse of the strip including means to actuate said holder and guide in directions transverse of the direction of longitudinal movement of said strip in timed relation to the reciprocation of said needle, said feed pawl being engageable with said fastener elements to feed the strip, and the feeding movements of said feed pawl being interrupted at a predetermined distance from the needle so that said transverse stitches are formed in accurately spaced relation to the fastener elements.

References Cited in the file of this patent

UNITED STATES PATENTS

| | | |
|---|---|---|
| 1,110,843 | Waldes | Sept. 15, 1914 |
| 1,915,580 | Rabinowitz | June 27, 1933 |
| 1,980,001 | Perlesz | Nov. 6, 1934 |
| 2,069,777 | Rohland | Feb. 9, 1937 |
| 2,153,006 | Roseman | Apr. 4, 1939 |
| 2,218,785 | Boettcher | Oct. 22, 1940 |
| 2,523,632 | Pearson | Sept. 26, 1950 |